Jan. 21, 1964  F. B. FISHBURNE  3,118,512
ELECTRICALLY CONTROLLED AUTOMATIC TWIN PACKER
Filed July 10, 1961  9 Sheets-Sheet 1

INVENTOR
Francis B. Fishburne
BY J. Hanson Boyden,
ATTORNEY

INVENTOR
Francis B. Fishburne

Jan. 21, 1964   F. B. FISHBURNE   3,118,512
ELECTRICALLY CONTROLLED AUTOMATIC TWIN PACKER
Filed July 10, 1961   9 Sheets-Sheet 9

FIG. 4g.

INVENTOR
Francis B. Fishburne
BY J. Hanson Boyden,
ATTORNEY

United States Patent Office 3,118,512
Patented Jan. 21, 1964

3,118,512
ELECTRICALLY CONTROLLED AUTOMATIC
TWIN PACKER
Francis B. Fishburne, P.O. Box 1927, Asheville, N.C.
Filed July 10, 1961, Ser. No. 123,008
14 Claims. (Cl. 177—80)

This invention relates to apparatus for filling and packing containers with loose compressible material, and more particularly to apparatus of the general type shown in my prior Patent No. 2,675,154, issued April 13, 1954.

This apparatus comprises a pair of fixed, horizontally spaced chargers beneath which containers, such as hogsheads, are placed, a power operated ram disposed above each charger and arranged to enter the same to compress the material which has been fed into it and the associated container, a reversible packer conveyor extending between the upper ends of the chargers, means for feeding a constant stream of material, such as tobacco, on to such conveyor, a pair of chutes or spouts adapted to receive the material from the ends of said conveyor and deliver it into the respective chargers, and means for moving said chutes or spouts horizontally back and forth from a position immediately over said chargers to a position at one side of said chargers, so as to be out of the path of said rams when they descend to compress the material which has been delivered.

In my above-mentioned patent, individual manual means was provided for controlling the various operations such as actuating the rams and shifting the spouts, and interlocking means was employed for rendering it impossible for power to be supplied to force a ram downwardly if the spout happened to be located beneath it, in its path of movement.

In my prior co-pending application Ser. No. 101,720 filed April 10, 1961, now Patent No. 3,060,977, issued October 30, 1962, I have disclosed means for automatically shifting the spouts back and forth, as the rams move upwardly and downwardly.

It is the general object of the present invention to devise further improvements to render the entire operating cycle of such a twin packer completely automatic, i.e., to provide means whereby the conveyor will be periodically reversed in proper timed relation with the movements of the rams, and the rams alternately operated to compress the material delivered into the chargers, so that, when once started, this cycle will be repeated indefinitely, without further attention by the operator.

Another object of the invention is to provide an automatic system of this character in which the period during which material is delivered into either charger in the filling stage of the cycle is automatically determined by the weight of material accumulated in the charger and associated container.

In the packing of tobacco in containers such as hogsheads it is usually desirable to make the charger of such height that it will accommodate approximately a thousand pounds, so that, when this is compressed into the hogshead by a single stroke of the ram, the filled hogshead will have roughly that weight. This is known as a "one fill" operation. However, if the tobacco is exceptionally light and fluffy, it has been found that it is impossible to get enough in a charger of practicable height to produce a weight of a thousand pounds. It then becomes necessary to pack the hogshead in two steps, that is to first put into the charger about five hundred pounds and compress that in the hogshead by one stroke of the ram, and then deposit in the charger another five hundred pounds and finally compress that in the hogshead by a second stroke of the ram, to make the desired weight of a thousand pounds. This is known as a "two fill" operation.

It is therefore a still further object of the invention to devise means controlled by the scale dial for automatically producing either a "one fill" or "two fill" operation, as required.

A further object is to provide means incorporated in such an automatic system for causing a substantial and adjustable time delay after the ram has reached the bottom of its compression stroke, before it is retracted. This is desirable in order to hold the mass of material under pressure for a predetermined time until it has "set," that is to say until it has reached a state in which it will remain in a satisfactorily compressed condition, i.e., in which the tendency for it to spring back when the pressure is released is substantially reduced.

Yet another and important object is to provide complete manual control means by which the automatic cycle may be interrupted at any point whatever, in case of emergency or special conditions. Thus, the upward or downward stroke of each ram may be instantly stopped when desired, and the direction of movement of both the packer conveyor and the supply conveyor may be manually reversed, as required. Furthermore, the arrangement is such that after the manual means has served its purpose, the automatic control means will take over and carry on, regardless of the position occupied by the parts as a result of the manual operation.

With the above and other objects in view, and to improve generally on the details of such apparatus, the invention consists in the construction, arrangement and combination of parts hereinafter described and claimed, and illustrated in the accompanying drawings, forming part of this specification, and in which:

Figures 1, 2, 4H:
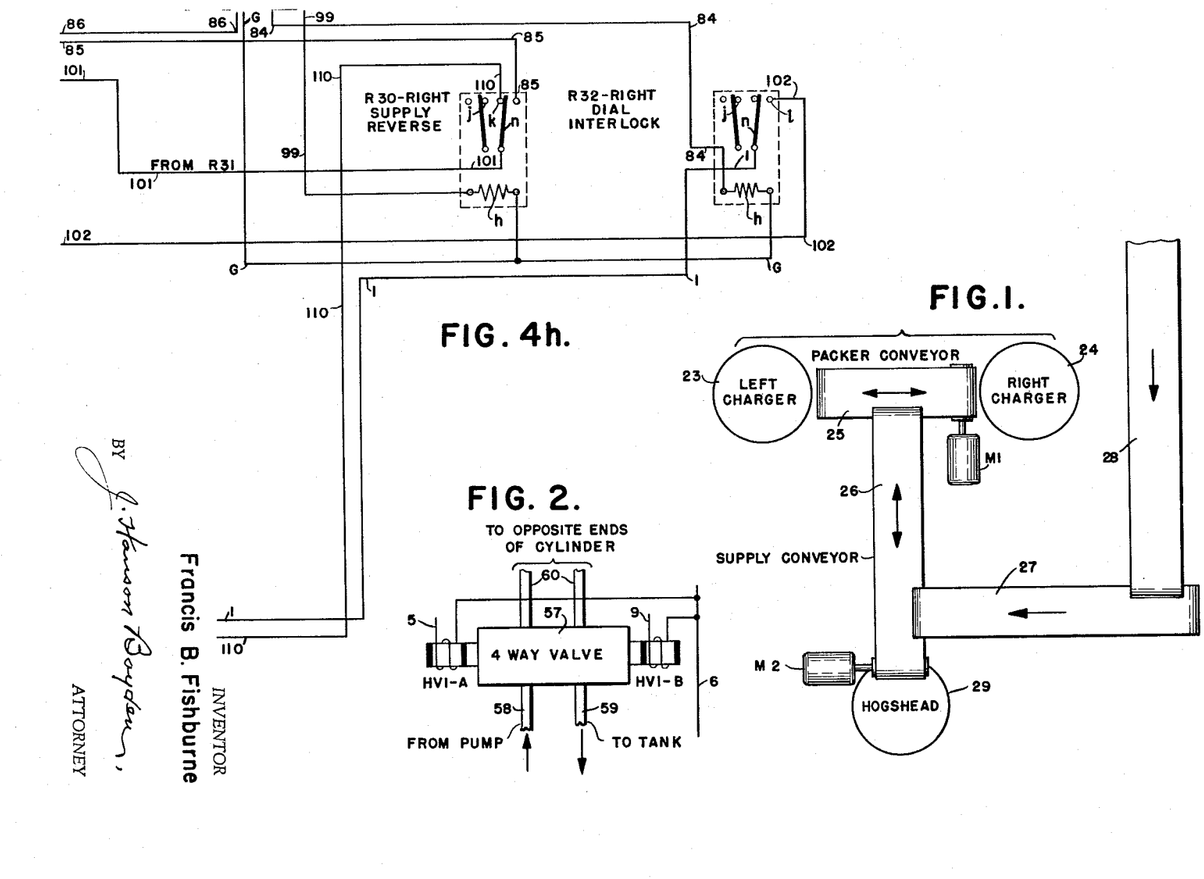
FIG. 1 is a schematic plan view showing the arrangement of chargers and conveyors employed in connection with the invention.
FIG. 2 is a schematic side elevation of one of the double solenoid-operated four way valves which I employ for controlling the supply of motive fluid to the cylinders operating the rams.
FIGS. 4a to 4h, taken together, constitute a complete electrical diagram showing the various circuits and electrical apparatus employed in carrying out the invention, FIGS. 4a and 4b showing circuits applying generally to both presses, FIGS. 4c and 4e showing the circuits controlling the left press, FIG. 4g showing the control of the control of the supply conveyor, and FIGS. 4d, 4f, and 4h showing the circuits controlling the right press.

Referring to the drawings in detail and more particularly first to FIG. 1, the invention involves a twin packer generally similar to that shown in my said prior Patent No. 2,675,154, that is to say it employs a pair of charges 23 and 24 between which extends a packer conveyor 25, driven by a reversible motor M1. The tobacco or other material is delivered from this packer conveyor into the top of the chargers either with or without rotary spouts or distributors such as shown in my said patent. The material is fed onto the packer conveyor 25 by means of a supply conveyor 26, driven by a reversible motor M2. The tobacco or other material may be brought to and delivered onto the supply conveyor 26 in any convenient way, as by means of endless conveyors 27 and 28.

The supply conveyor 26 will usually occupy an inclined position and beneath its lower end, namely the end remote from the packer conveyor, is placed a hogshead or other receptacle 29, for a purpose hereinafter described.

As in my said patent, each charger delivers into a hogshead, which is usually supported on a wheeled dolly. I preferably employ an arrangement in which the wheels of the dolly rest upon tracks which are supported during the filling operation on the platform of a well known type of weighing scale, having a scale dial 44, and for removing the wheels from the tracks so as to take the load off of the scale platform during the pressing operation, as is well known in the art. In the present case, this is accomplished by raising and lowering the tracks by means of air cylinders, the supply of motive fluid to which is controlled by spring-biased valves AV1 and AV2, each operated by a solenoid $v$, as hereinafter more fully explained.

The supply of motive fluid to the main ram cylinder is controlled, as in my said prior patent, by means of a special 4-way valve 57. The fluid under pressure is supplied to pipe 58 by means of a pump, while it is exhausted through pipe 59 to a tank. From the other side of the valve extend pipes 60 to the opposite ends of the main ram cylinder such as indicated at A1 in FIG. 4c.

While in my said prior patent these 4-way valves were manually operated, in the present invention I operate them by means of a pair of solenoids disposed at opposite ends of the valve casing. Current is supplied to one of these solenoids by a wire 5, and to the other by a wire 9, the other sides of the solenoids being grounded. The flow of current through the wires 5 and 9 is automatically controlled by relays as hereinafter more fully described in connection with the complete circuit diagram.

It will be understood that, for the sake of simplicity, no attempt has been made to illustrate the details of the 4-way valve shown in FIG. 2. Valves of this type are well known and commercially available, as for example from Vickers Incorporated. They are described as "double-solenoid spring-centered 4-way valves." The term "spring centered" means that the valve returns to normal central position when neither solenoid is energized.

Referring now to the complete circuit diagram illustrated in FIGS. 4a to 4h, it will be understood that this diagram illustrates the control circuits for both the right and left hand presses of the twin packer. It may be pointed out that to facilitate an understanding of the circuits and, so far as practicable, I have adopted the plan of designating by even numbers the elements related to the right hand press and by odd numbers the elements related to the left hand press. It may also be pointed out that, for the sake of clearness, I have designated by the same reference numeral all parts of a conductor system which are permanently connected together, even though the conductors may extend over several sheets of the drawings.

Figure 3:
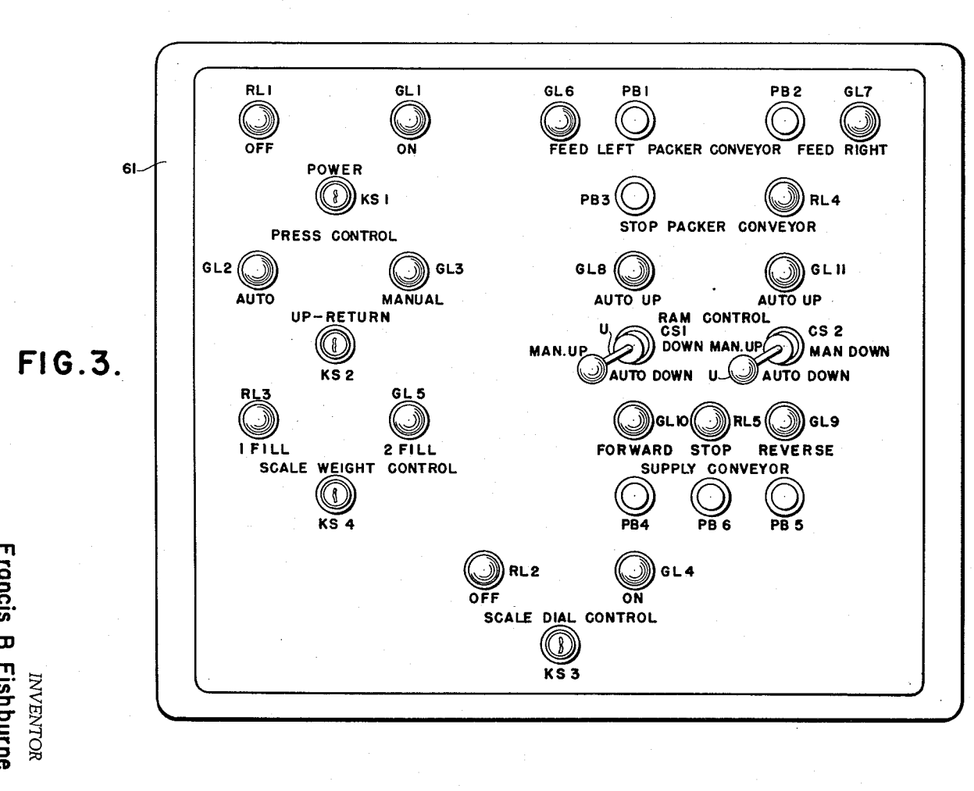
FIG. 3 is a front elevation showing the operator's control panel used in connection with my improved automatic system.

In FIG. 3, showing the control panel, I have used the same identifying characters to indicate the parts as appear in the figures making up the circuit diagram. It will be seen that in both the circuit diagram and on the control panel I have illustrated four so-called key switches, designated KS1, KS2, KS3, and KS4. This type of switch is normally locked and can only be operated by insertion of the proper key. The use of such key switches is desirable in order to prevent operation by unauthorized persons.

Also illustrated in the circuit diagram and on the control panel are a pair of 4-way ram-control manual switches, designated CS1 and CS2. These switches are operated by a so-called "wobble stick" designated $u$. Each of these switches is spring biased to normal or neutral position, and each embodies two pairs of contact bars $q$, $r$, $s$ and $t$, disposed at right angles to each other like the sides of a square. The wobble stick can be moved vertically, as viewed in FIGS. 4c and 4d, to bring one pair of contact bars into and out of engagement with adjacent fixed contacts, and can be moved horizontally to bring the other pair of contact bars into and out of engagement with other pairs of fixed contacts adjacent thereto. No attempt has been made to illustrate the details of these 4-way switches, since they are well known pieces of equipment and are commercially available as for example from Allen-Bradley Co.

Also illustrated in the circuit diagram and on the control panel of FIG. 3 are a series of push buttons designated PB1, PB2, PB3, PB4, PB5 and PB6.

Further illustrated are a number of red and green signal lights, the red signal lights being designated RL1, RL2, RL3, RL4 and RL5, and the green signal lights being designated GL1 to GL11 inclusive.

Other important pieces of equipment illustrated in the circuit diagram are four solenoid-operated, conveyor control relays designated CR1, CR2, CR3 and CR4. Each of these conveyor relays comprises a solenoid winding $a$ and a pair of contact bars $b$ and $c$, each bar being arranged to engage either of two pairs of fixed contacts.

There are also timing switches, one for each press, designated TS1 and TS2. The purpose of these will of course be hereinafter fully explained. Each of these timing switches includes a solenoid $o$ and a contact bar $p$, the latter being arranged to play between two pairs of fixed contacts.

In addition to the solenoid operated relays just described there are illustrated in the circuit diagram a large number of standard double contact relays designated R1 to R32 inclusive. Each of these relays comprises a coil or winding $h$, four fixed contacs $i$, $j$, $k$, $l$, and a pair of movable contacts $m$ and $n$.

When the coil $h$ is de-energized, the movable contacts are in engagement with the inner fixed contacts $j$ and $k$, and when the coil is energized, the movable contacts engage the outer fixed contacts $i$ and $l$. Although from an inspection of the diagram it will be seen that in many cases some of the fixed contacts are idle, that is to say are not connected to anything, nevertheless I prefer to employ these standard relays throughout the system as they are well known and commercially available.

In practice these relays are preferably mounted inside of a cabinet the front wall or cover of which is formed by the control panel 61 illustrated in FIG. 3.

In addition to the abovementioned elements, the circuit diagram also illustrates schematically the left and right hand presses. The left hand press comprises a main cylinder A1 and a plunger or ram B1, the latter carrying a vertically extending control tube C1. Similarly the right hand press comprises a cylinder A2, a ram B2 and a control tube C2.

It may be explained that these control tubes are illustrated and described in detail in my prior Patent No. 3,060,977. On each control tube is mounted a pair of cams $d$ and $e$ spaced a substantial distance apart as shown. These cams engage and operate levers $g$ connected with contact bars $f$ of two pairs of up and down limit switches designated LS1, LS2, LS3 and LS4. As shown in the diagram the contact bar $f$ and lever $g$ are movable from the position shown in full lines to the position illustrated in dotted lines. In these switches the free or normal position of the parts $f$ and $g$ are shown in full lines while position in dotted lines is that to which the switch has been moved by engagement with the cam $e$.

Figures 4A, 5:
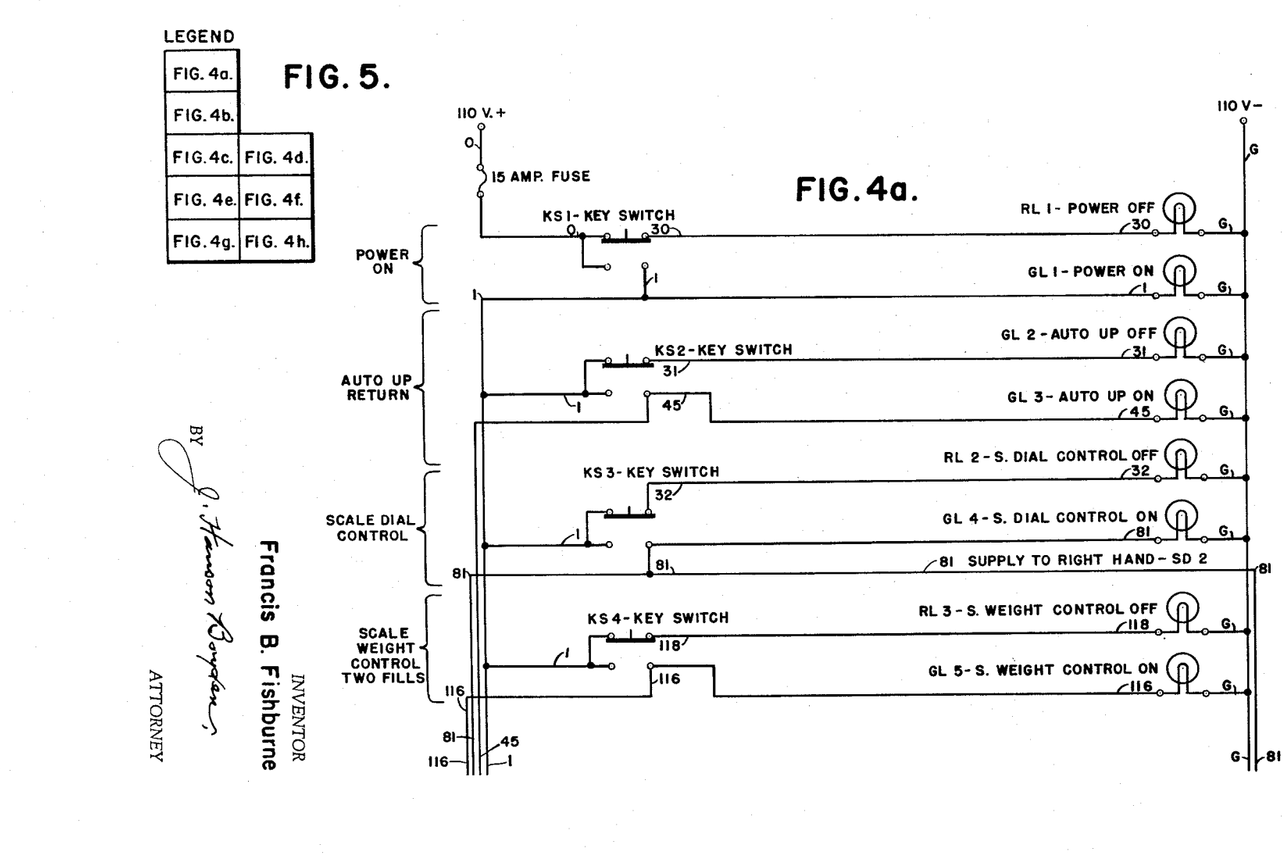
FIG. 5 is a chart showing how the sheets containing the various FIGS. 4a to 4h should be arranged to produce a complete diagram of the circuits.
Figure 4B:
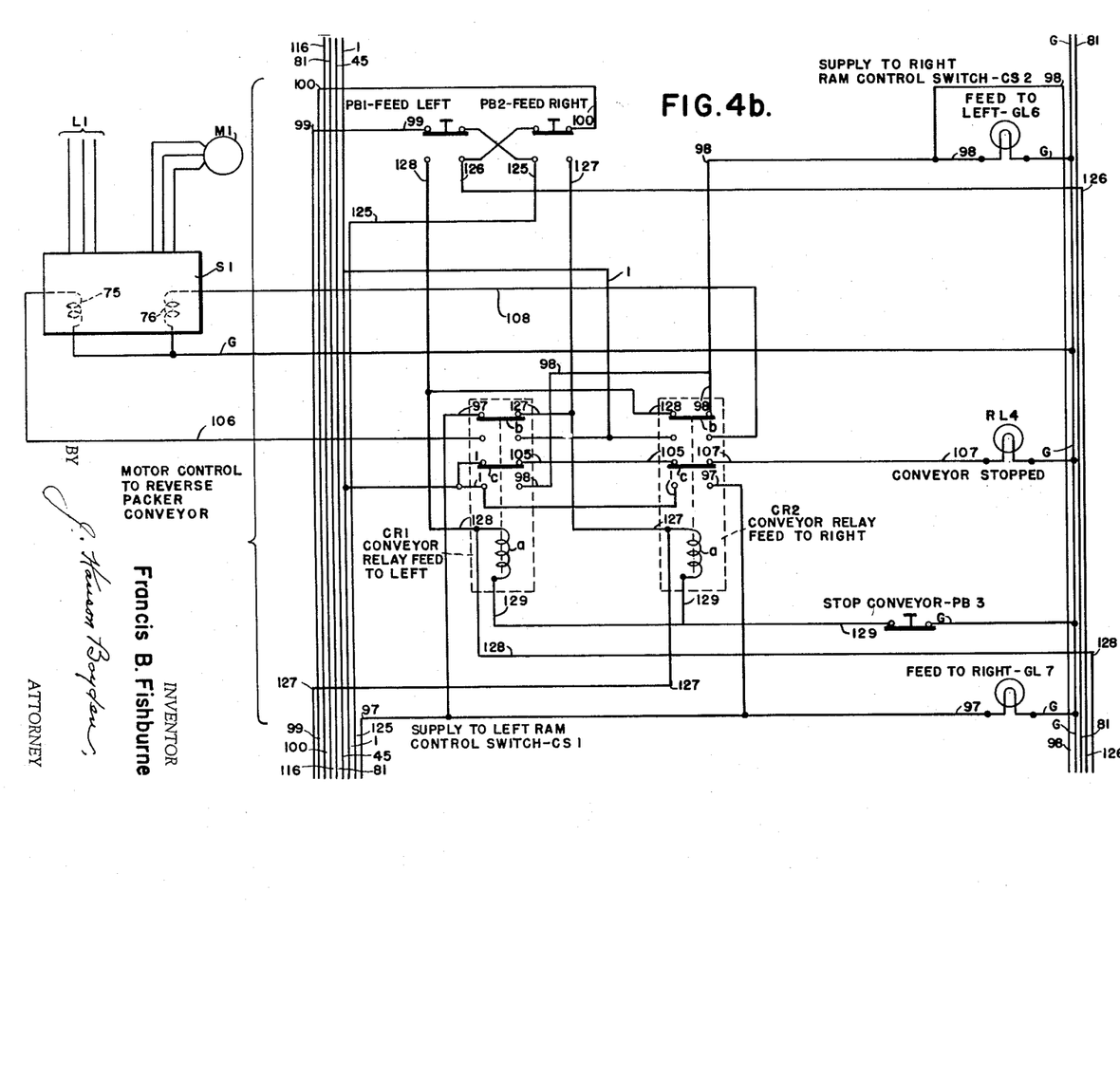
Figure 4C:
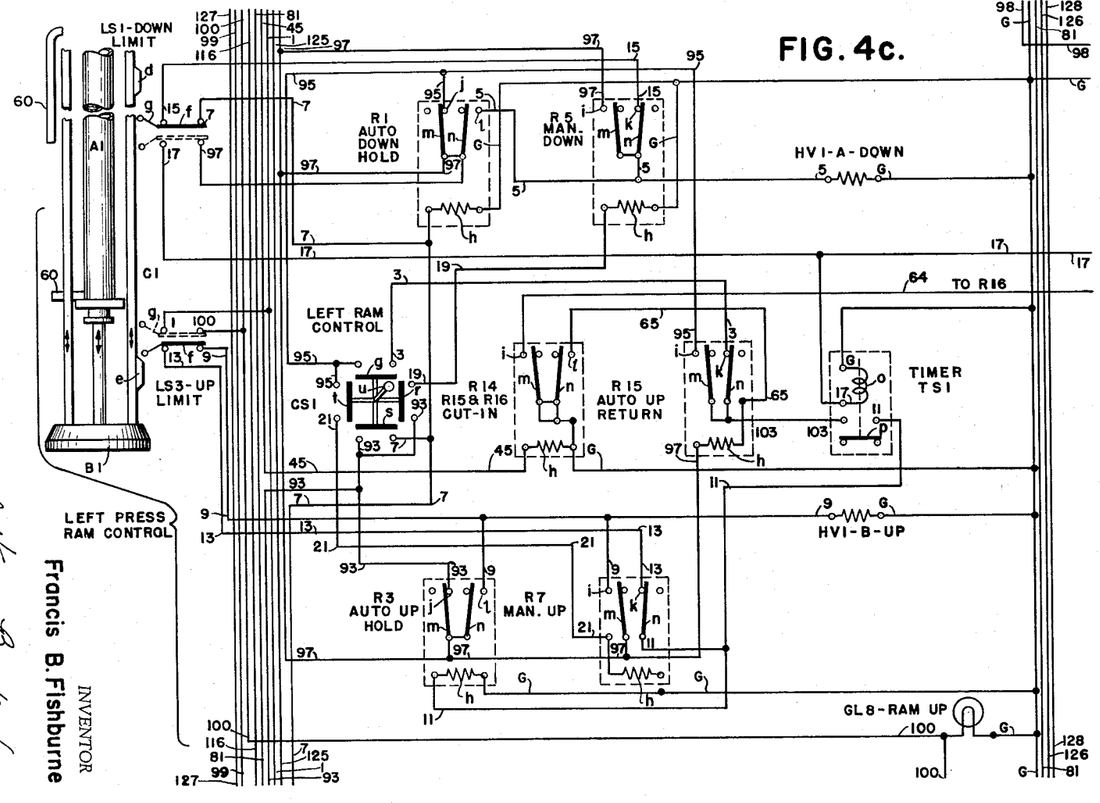
Figure 4D:
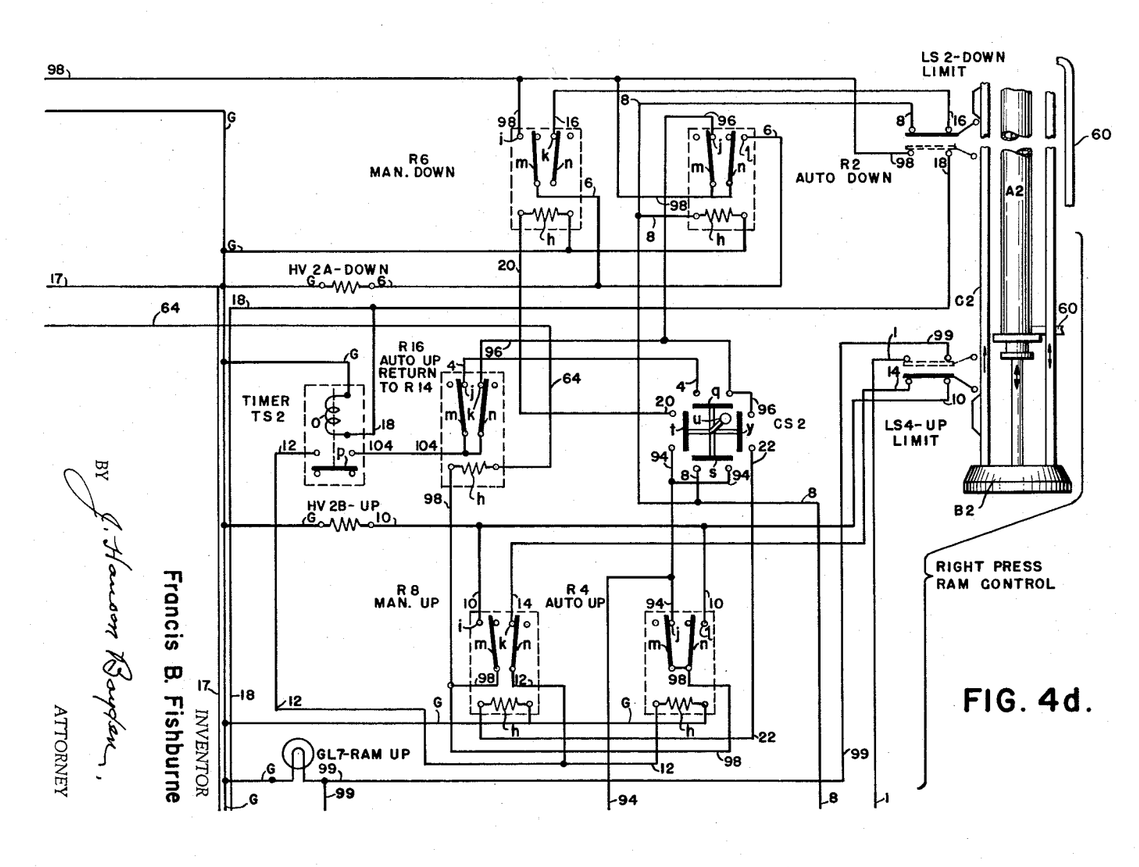
Figure 4E:
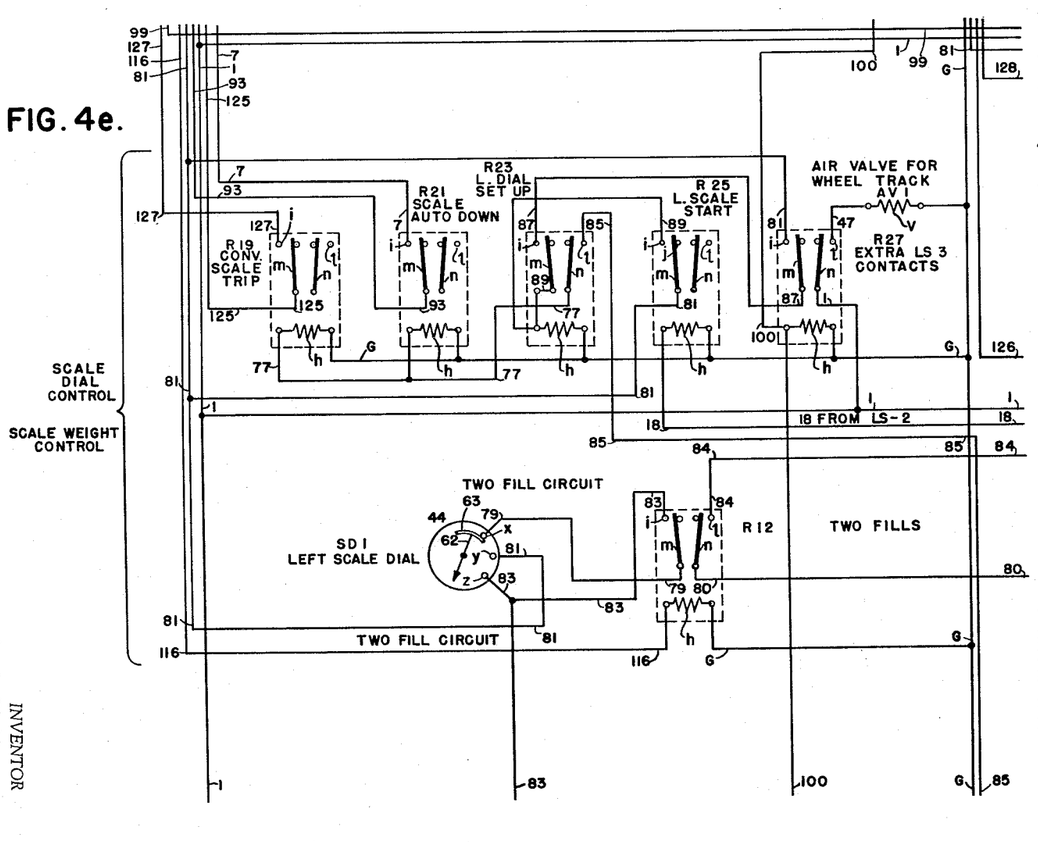
Figure 4F:
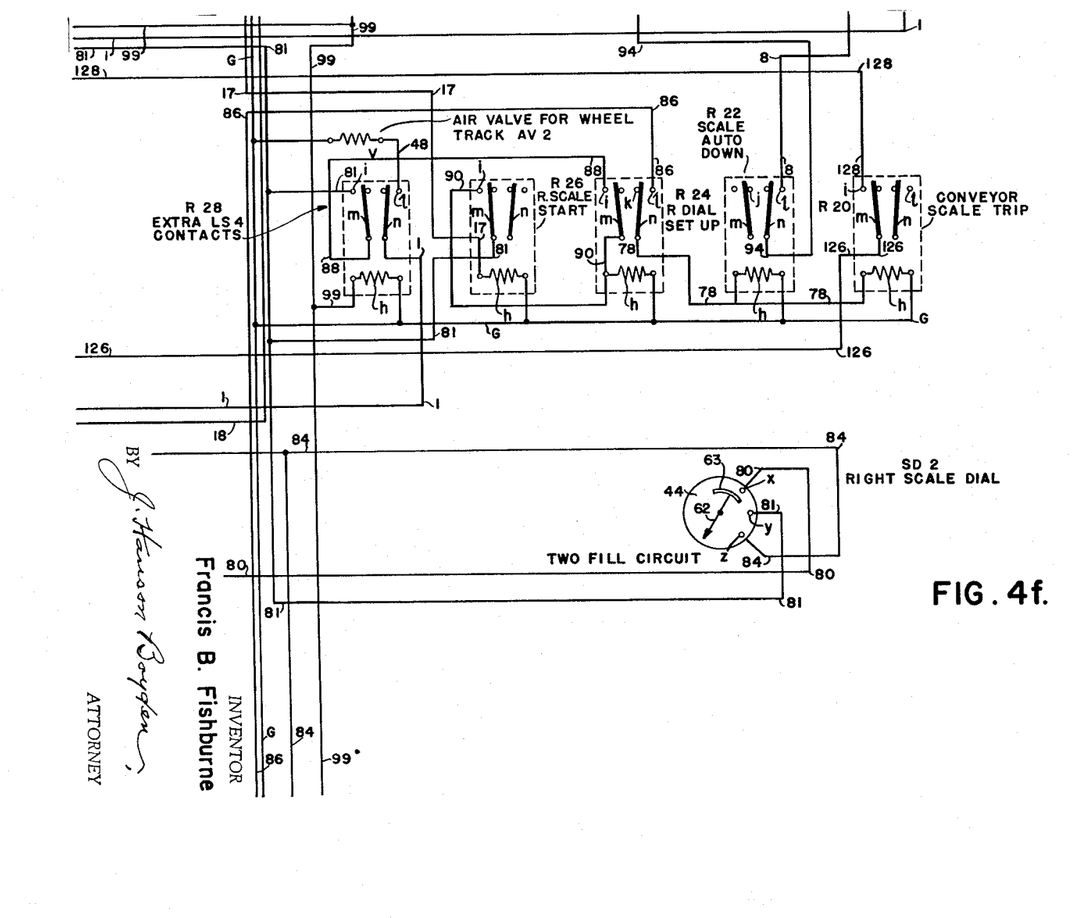
Figure 4G:
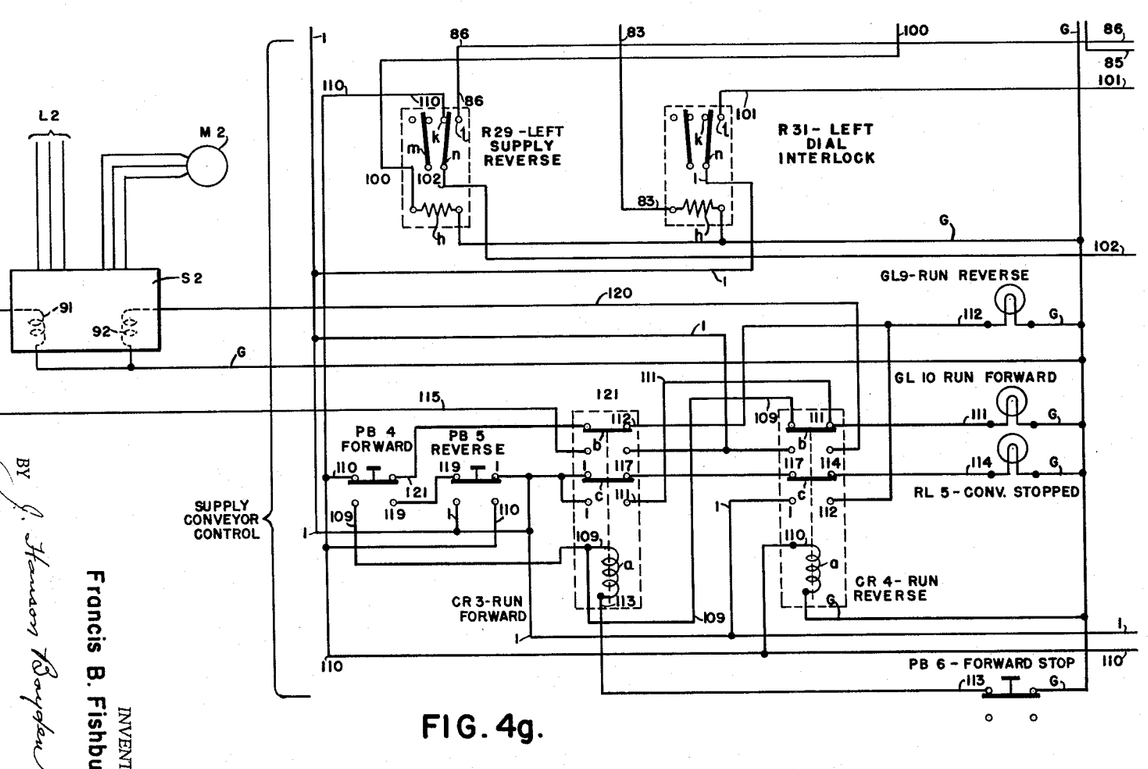

The motors M1 and M2 for driving the packer and supply conveyors respectively as shown in FIG. 1 are schematically illustrated in FIGS. 4b and 4g and are designated by the same characters. These motors are shown as of the three phase type fed with current by lines L1 and L2 and controlled by starting and reversing mechanisms S1 and S2. The starting and reversing mechanism S1 contains control coils 75 and 76, while the starting and reversing mechanism S2 contains control coils 91 and 92. These four control coils are connected into the complete circuit as illustrated in the diagram in a manner hereinafter more fully described. Suffice it to say for the present that when coil 75 is energized it serves to start the motor M1 and cause it to run in one direction, and when the coil 76 is energized it serves to start the motor and cause it to run in the opposite direction. The same is true of the coils 91 and 92 shown in connection with the motor M2. These magnetically controlled starting and reversing mechanisms are well known and commercially available, as for example from Allen-Bradley Co., Milwaukee, Wis.

The weighing scale dial 44 is illustrated at SD1 in FIG. 4e and at SD2 in FIG. 4f. Each dial has a pointer 62 moving over the scale and three fixed contacts $x$, $y$ and $z$, disposed in circumferentially spaced relation. In actual practice suitable mercury tube switches are used for closing the various circuits on these scale dials but for the sake of simplicity and clearness I have shown the pointer 62 as carrying a curved contact bar 63 adapted to bridge either the contacts $x$ and $y$ or the contacts $y$ and $z$, depending upon the angular position of the pointer.

In considering the complete circuit diagram the sheets of drawing marked FIG. 4a to 4h inclusive should be arranged as shown in FIG. 5. The three sheets in the right-hand column relate to the controls for the right-hand press while the other figures relate either to the control of the left-hand press or to circuits not relating particularly to either press.

Referring first to FIG. 4a, the key switch KS1 when off supplies current from wire 0 to signal light RL1 through wire 30. When turned on this switch connects wire 0 with wire 1 thus lighting signal lamp GL1. The wire 1 also extends down across FIGS. 4b, 4c, 4e and 4g ready to supply current to the various controls such as push buttons PB1, PB2, PB4, and PB5, the limit switches LS3 and LS4, the control relays CR1, CR2, CR3 and CR4, as well as numerous other standard relays. In FIG. 4e wire 1 has two branches extending over to FIG. 4f and from FIG. 4f it extends up to FIG. 4d to supply current for the right-hand press control, and over to FIG. 4h to relay R32.

Key switch KS2, when in off position connects wire 1 with signal light GL2 through wire 31. When turned on it connects wire 1 with signal lamp GL3 through wire 45. This wire 45 also extends down across FIG. 4b and into FIG. 4c to supply current to the coil of relay R14 which when energized establishes a ground connection for relay R15 through contacts $n$ and $l$ and wire 65, and the ground connection for relay R16 through contacts $m$ and $i$ and wire 64.

When the left-hand press plunger B1 is up, the limit switch LS3, which has been engaged by cam $e$, connects wire 1 with wire 100 through the bar $f$, thus supplying voltage to push button PB2 in FIG. 4b. In the normal position of push button PB2, wire 100 feeds wire 126 which extends across FIG. 4c to FIG. 4e and thence across to FIG. 4f where it connects with relay R20.

At the same time if the plunger B2 of the right-hand press is down, limit switch LS4 connects wire 1 with wire 99. In the normal position of push button PB1, the wire 99 which extends from FIG. 4d across FIG. 4f to FIG. 4h where it connects with relay R30, with a branch extending along FIG. 4e, and going up across FIG. 4c and thence into FIG. 4b to push button PB1, is connected with wire 125 which extends down across FIG. 4c to FIG. 4e and there connects with relay R19.

To start up the equipment and run packer conveyor 25 to the left, the operator depresses push button PB1. This connects wire 100 through push button PB2 to wire 123 which energizes coil $a$ of control relay CR1 through wire 129, thus pulling down bar $b$ and connecting wire 1 through wire 106 with coil 75 of the automatic starting and reversing mechanism S1 causing the motor M1 to move packer conveyor towards the left. At the same time bar $c$ bridges wires 1 and 98 thus lighting signal lamp GL6.

Wire 128 also extends across FIGS. 4c to 4e, whence it goes over into FIG. 4f and connects with the contact $i$ of relay R20. Relay CR1 is self-holding through normally closed contacts 98 and 128 of relay CR2. To stop the conveyor, the operator pushes button PB3, which de-energizes relay CR1. Bar $c$ then bridges wires 1 and 105, and through wire 107 lights signal lamp RL4.

To run the packer conveyor to the right, the operator pushes button PB2. This connects wire 99 through push button PB1 to wire 127 which energizes coil $a$ of relay CR2 pulling down bar $b$, breaking the holding circuit of relay CR1, and connecting wire 1 through wire 108 to the coil 76 of the starting and reversing mechanism S1, causing motor M1 to move conveyor 25 towards the right. Bar $c$ bridges wires 1 and 97 thus lighting signal lamp GL7. Wire 127 also extends across FIG. 4c into FIG. 4e where it connects with contact $i$ of relay R19. Relay CR2 is self-holding, through wires 97 and 127 of relay CR1. The conveyor is stopped by pushing button PB3 as before.

The control system for the supply conveyor 26 is shown in FIG. 4g, and includes the push buttons PB4 and PB5.

To start the supply conveyor forward the operator presses push button PB4. This connects wire 1 through push button PB5 and wire 119 to wire 109 which energizes coil $a$ of relay CR3 through wire 113, pulling down bar $b$ which connects wire 1 through wire 115 to coil 91 of the starting and reversing mechanism S2 for supply conveyor motor M2. At the same time bar $c$ connects wire 1 with wire 111 which lights signal lamp GL10. Relay CR3 is self-holding through bar $c$ which sends current through wire 111, bar $b$ of relay CR4 and wire 109. Forward travel of the conveyor is stopped by push button PB6, and the signal lamp RL5 is lighted through bar $c$ of relays CR3 and CR4 in series, and wires 117 and 114.

The conveyor may be reversed by pushing the reverse button PB5. This connects wire 1 with wire 110, energizing coil $a$ of relay CR4, pulling down the bar $b$ and breaking the holding circuit for relay CR3. Bar $b$ also connects wire 1 through wire 120 with coil 92 of the starting and reversing mechanism S2. At the same time bar $c$ bridges wires 1 and 112 thus lighting signal lamp GL19. Relay CR4 is self-holding through wire 112, bar $b$ of relay CR3, wire 121, push button PB4 and wire 110.

The reverse travel of the conveyor may be stopped by pressing forward push button PB4, which breaks the above described holding circuit through this push button and energizes relay CR3.

MANUAL OPERATION

Assuming that the right press plunger is up, and with limit switch LS4 bridging wires 1 and 99, lighting signal lamp GL7 allowing the packer conveyor to move toward the right, current can be supplied for operation of the left press ram through wire 97, from conveyor relay CR2. To cause the left plunger or ram to make a down stroke, the operator manipulates the manual switch CS1 (commonly called "wobble stick"), moving it to the right, the bar $r$ bridging wires 19 and 93, thus energizing coil $h$ of relay R5 connecting wire 97 to the "down" coil of the hydraulic valve HV1-A, through wire 5, thereby admitting motive fluid to the top of the cylinder A1. Wire 93 is made live through relay R3, when in "dead" position shown in FIG. 4c, from wire 97, which is supplied with current from live wire 1 through bar $c$ of relay CR2, when pulled down to cause conveyor 25 to feed to the right.

The operator holds the control switch CS1 over to the right as long as he wants the ram to continue to move, and when he releases the switch it returns to neutral position, the ram stops.

To raise the ram, the operator moves the stick $u$ to the left causing the bar $t$ to bridge wires 95 and 21, thus energizing coil $h$ of relay R7, connecting wire 97 to wire 9 and thus supplying current to valve solenoid HV1-B.

AUTOMATIC OPERATION

If the ram is up, and it is desired to have it move downward automatically, the operator initiates the movement by "bumping" the stick momentarily down, thus causing bar s to bridge wires 93 and 7. This energizes coil h of relay R1, thus causing contact n to engage contact l and supplying current from wire 97 through wire 5 to the solenoid valve HV1–A to move the plunger downward. A holding circuit is established from wire 5 through contacts n and k of relay R5, and through normally bridged wires 15 and 7 of limit switch LS1. The ram continues to move until its cam d contacts limit switch LS1, disengaging wires 15 and 7, breaking the holding circuit, and stopping the ram. The ram may also be stopped at will and at any desired point of its stroke by moving manual control switch CS1 to the right, momentarily, thus energizing relay R5, and breaking the holding circuit through wires 5 and 15. The limit switch, when contacted by the cam on the ram, bridges wires 17 and 97, thus energizing coil o of the time switch TS1, and, after a suitable interval, this pulls up bar p, bridging wires 11 and 103, the latter of which connects with wire 3 through contacts n and k of relay R15.

If thereafter it is desired to have the ram move upward automatically to the top of its stroke, the operator momentarily "bumps" the stick u upwardly causing the bar q to bridge wires 95 and 3, thus supplying current through wires 103 and 11 to coil h of relay R3 and causing contact n to connect wire 97 with wire 9, thus energizing valve solenoid HV1–B. A holding circuit is established through limit switch LS3 via wires 9 and 13 and to 11 through contacts k and n of relay R7, which is broken by cam e when ram A1 reaches the up limit of its movement, and is thus stopped.

The ram may also be stopped at any desired point by moving the manual control switch CS1 momentarily to the left, thus energizing relay R7, and breaking the holding circuit through wires 13 and 11.

If it is desired to have the ram move upward automatically after the timer TS1 has operated, without the necessity of the operator bumping the manual control switch, the key switch KS2 is turned on, thus energizing relay R14 through wire 45, thereby supplying a ground for the coil of relay R15, as above explained, so that it may be energized by current from wire 97. When thus energized, relay R15 connects timer wire 103 through wire 95 and relay R1 to live wire 97, thus by-passing the manual switch CS1 and causing voltage to be always present in wire 103. When the timer operates, it connects wire 103 to wire 11, through bar p, thus energizing relay R3, which then connects wire 97 to wire 9 and the "up" solenoid of valve HV1–B.

Similarly, the right-hand press may be operated by the control switch CS2 (FIG. 4d) either manually down or up through the relays R6 or R8, by moving the stick u to right or left and holding it, or automatically by momentarily bumping the control switch to set up the holding relays R2 or R4 governed by the limit switch LS2 and LS4 and the timer TS2. The ram B2 is moved upwardly and downwardly by the solenoid valves HV2–A and HV2–B respectively. It will be noted that the reference numerals in this FIG. 4d are even numbers, differing by one digit from the odd numbers used in describing the circuits for the left-hand press in FIG. 4c and it is thought that the operation can be readily understood without further discussion.

Relays R27 and R28 provide extra contacts for limit switches LS3 and LS4 respectively. Note that they are energized by wires 100 and 99, extending respectively from contacts of these switches. The contacts m of these relays serve to connect wires 87 and 88 respectively with wire 81 extending to the scale dials 44, as hereinafter more fully explained, while contacts n of these relays serve to connect wire 1 with the solenoid coils v of the two wheel track air valves AV–1 and AV–2 respectively.

It will be understood that, whether manually controlled or automatically operated, the press rams actuate the up limit switches when they reach their top position, thus energizing these solenoids and lifting the wheel tracks so that the weight of the hogshead will be supported on the scale platform during the subsequent filling operation.

COMPLETE CYCLE CONTROL BY SCALE DIALS

Assuming that both conveyors are running, with the left ram up and the packer conveyor feeding toward the left, and it is desired to control the operation entirely automatically by means of the scale dials, the key switch KS3 is turned on. In its "off" position the red signal lamp RL2 is lighted over wire 32.

When the key switch is turned on it connects wire 1 with wire 81. This lights signal lamp GL4. Wire 81 extends down to the left, across FIG. 4b and across FIG. 4c to FIG. 4e where it is connected with the contact y of the scale dial 44 of SD1. Similarly wire 81 extends from the lower right side of FIG. 4a down across FIGS. 4b and 4c to FIG. 4e where it turns to the right and goes over to FIG. 4f and connects with the contact y of the dial 44 of right-hand scale SD2. Thus wire 81 is connected with the middle contact of both scale dials SD1 and SD2.

As the tobacco is delivered into the charger and hogshead of the left-hand press, the pointer 62 of the left-hand scale SD1 begins to move over the dial 44 until the arcuate contact 63 bridges the fixed contacts x and y. Nothing happens at this point as so far described because the circuit 79 extending from contact x is open at the contact i of relay R12.

As the weight of the tobacco in the charger increases, the pointer 62 moves around the dial progressively further and further until the arcuate contact 63 finally bridges the contacts y and z. The position of the contact z is such as to correspond approximately to a weight of 1,000 pounds. When the contact 63 engages contact z, it closes a circuit from wire 81 to wire 83. This sends current from wire 83 through coil h of relay R31 (FIG. 4g), thus energizing this relay and connecting wire 1 through contacts n and l with wire 101. This extends over to contact n of relay R30 (FIG. 4h).

If the ram B2 of the right-hand press is up, the limit switch LS4 serves to energize this selector relay R30 over wires 1 and 99 (FIG. 4d), and connects wire 101 to wire 85 (FIG. 4h). Wire 85 extends to relay R23, where, if this relay is energized, wire 85 is connected with wire 77. Relay R23 is energized by wires 89 and 81, through relay R25, which, in turn, is energized from limit switch LS2, over wire 18.

Wire 77 sends current simultaneously through the coils of both relays R19 and R21.

Relay R19 serves to connect wires 125 and 127 (the same as depressing push button PB2). Wire 125 is connected to live wire 99 through push button PB1, when in normal position, as shown in FIG. 4b, so that it feeds current through wire 127 to coal a of control relay CR2 (FIG. 4b), thus reversing the packer conveyor motor M1 through control wire 108, as above described.

When relay CR2 pulls down, it connects wire 1 to wire 97. Current is delivered from wire 97 to relay R3 (which is "dead" provided the ram is not already in an automatic cycle), and thence through contact m to wire 93.

Relay R21, mentioned above as having been energized, connects wire 93 to wire 7, through its contact m, and wire 7 feeds current to coil h of relay R1 (FIG. 4c). This connects wire 97, through contacts n and l with wire 5, which sends current through the "down" solenoid of hydraulic valve HV1–A, forcing the ram downwardly. Thus the ram is put into an automatic down cycle, with holding circuit and controls as described above under "Automatic Operation."

A completely automatic cycle of the right-hand press ram will occur in a similar manner, controlled by the pointer of the right-hand scale dial SD2, when the desired weight is reached.

It will thus be understood that an electrical impulse sent out from a scale dial over wire 83, when the pointer indicates the desired weight, does two things. It reverses the packer conveyor, through the medium of relay R19, and at the same time, starts the ram moving downward, through the medium of relay R21, as above described. So far as I am aware, this is a broadly new concept.

Referring to the reversal of packer conveyor by relay R19, as above described, it will be understood that this is the normal operation, when the ram is up. Under these circumstances, wire 99 will be live, thus energizing relay R30, and wire 101 will be connected with wire 85. If, however, the ram is not up all the way to the top, wire 99 will be dead at the limit switch, and relay R30 will not be energized, and the impulse from wire 101 will go to wire 110. This, in turn, will energize the coil $a$ of control relay CR4 (FIG. 4g) and thus reverse the supply conveyor, motor M2.

It will therefore be noted that if, during the automatic cycle operation, the ram of either press should, for any reason, not be all the way up, the impulse from the scale dial, instead of reversing the packer conveyor to deliver into that press, will reverse the supply conveyor, thus cutting off the delivery of tobacco to the packer conveyor and avoiding the dumping of tobacco on top of the ram. This is a very important, and, I believe, broadly novel feature.

TWO FILL OPERATION

If the tobacco being packed is especially light and fluffy, it is necessary to use the "two fill" circuit. To do this, the operator turns on key switch KS4 (FIG. 4a), in addition to the other key switches. When this switch is off, it lights signal lamp RL3 through wire 118. When turned on it supplies current to wire 116 and lights signal lamp GL5. Wire 116 extends down across FIGS. 4b and 4c and energizes coil $h$ of relay R12 (FIG. 4d). This connects wire 79 to wire 83 (and also wire 80 to wire 84 for the right-hand scale dial). Thus when the pointer contact 63 bridges contacts $x$ and $y$ of wires 79 and 81, coil $h$ of the relay R31 is energized. This connects wires 1 and 101, as above described. The position of contact $x$ on the dial corresponds with a weight of approximately 500 pounds.

It has been explained how set up relay R23 is energized through limit switch LS2. Similarly, set up relay R24 is energized through limit switch LS1. This is so, whether the one-fill or the two-fill circuit is being used.

Relays R23 and R24 must be self-holding in order to deliver the scale impulses to relays R19 and R21. Relay R23 becomes self-holding through relay R27, energized by limit switch LS3, and relay R24 similarly becomes self-holding through limit switch LS4. These holding circuits are of course broken when the limit switches are operated by the rams. Wires 18 and 17 get impulses and relays R25 and R26 will click every time the rams go down, but no impulse goes beyond relays R23 or R24 except as now described.

Relay R12 (FIG. 4e) having been energized by key switch KS4, connects wire 79 with wire 83. When, therefore, the left scale dial registers 500, and the pointer bridges contacts $x$ and $y$, thus connecting wires 81 and 79, an impulse is sent from wire 81 to wire 79 and thence through relay R12 to wire 83, which works relays R19 and R21, as described before, thereby reversing the packer conveyor and initiating the downward movement of the left press ram. Relay R23 is "killed" by the breaking of the holding circuit at limit switch LS3.

The left press ram then engages limit switch LS1, which stops its down stroke and also sets up relay R24 through relay R26 and wire 17, and also actuates timer TS1. Meanwhile, the right-hand press is filling. After the timer operates, the left ram starts up, and when it reaches top position, the wheel tracks lift, as already described, and the scale which returned to zero indication during the down stroke, starts weighing again. But no impulse goes beyond relay R23, because this is dead at the time.

In due course the right-hand scale dial SD2 reaches 500 pounds, and an impulse is sent from wire 81 to dial contact $x$ through wire 80 (FIG. 4f) to relay R12 and thence to wire 84, which energizes relay R32, thus connecting wire 1 to wire 102. This wire 102 goes through contacts $n$ and $l$ of relay R29 to wire 86, which goes through contacts $n$ and $l$ of relay R24, which has been energized or set up by limit switch LS1. Thus wire 86 energizes relays R20 and R22 (corresponding with relays R19 and R21 of the left press control circuit, above described), thereby reversing packer conveyor and starting right press ram down. Relay R24 is killed by the breaking of the holding circuit at limit switch LS4.

Meanwhile, as tobacco is delivered again to the left-hand press, the arcuate contact 63 of the pointer 62 moves beyond the 500 pound mark, that is to say, beyond the contact $x$, so that when relay R23 is again set up, reversal of the conveyor or downward stroke of the left-hand ram does not occur until the second fill causes the scale to register 1000 pounds, that is to say, until the arcuate contact 63 engages the contact $z$, and sends an impulse out over the wire 83 and relay R23 as previously described.

Meanwhile, the right ram continues its downward stroke until stopped by engaging limit switch LS2, which also energizes or sets up relay R23 through relay R25, and wire 18, and also actuates timer TS2. After the timer operates, the ram returns to the top. The wheel track of the right press is then raised by air valve AV-2, and the scale starts weighing again, as tobacco continues to be delivered. Thus the cycle is repeated indefinitely.

While, for the sake of clearness, I have illustrated the scale dial as provided with three contacts over which the pointer moves, the invention is by no means limited to such a construction, as many other possible arrangements will readily suggest themselves to those skilled in the weighing scale art. As hereinbefore stated, one method would be to attach mercury tube switches to the pointer. The invention contemplates broadly the provision of a normally "live" contact and two other contacts operatively associated with the conveyor and ram control circuits, and means operated by the weighing scale for connecting the live contact with one of the said pair of contacts when a definite, relatively small weight is registered, and for connecting the live contact with the other of said pair of contacts when a definite greater weight is registered.

The invention also contemplates the provision of a control panel, and remote control means, such for example as relay R12, operated by a manual switch on said control panel for connecting the said pair of contacts together, when desired.

OTHER FEATURES

(a) Interlock (1) When the "automatic down" relay R1 is energized by wire 7 from either manual control switch CS1 or relay R21, it breaks the connection with wire 95, so that the "up" contacts of manual switch CS1 are deprived of current.

Similarly, when the "automatic up" relay R3 is energized by wire 11 from timer TS1, it breaks the connection with wire 93, so that the "down" contacts of manual switch CS1 are deprived of current.

Thus, by virtue of this interlock, the manual switch cannot set up a circuit tending to move the ram in a direction opposite to that in which it is moving under the control of the automatic relays.

(2) As already mentioned, when an impulse is sent out from a scale dial for the purpose of reversing the packer conveyor, it is not effective to reverse this conveyor unless the ram is all the way up.

(b) Manual Take-Over From Automatic (1) While the apparatus is operating under scale dial control, as above described, and is waiting for scale impulse to reverse the packer conveyor, this conveyor can be manually reversed by push buttons PB1 or PB2, without affecting the automatic cycle.

(2) When, during any cycle, the pointer of the scale dial has reversed the packer conveyor and started the ram down, the ram can be stopped at any point by the manual control switch, such as CS1, and further operated at will, manually, without affecting the automatic cycle. Thus, if switch CS1 is moved over to the right and held in that position, it energizes the coil of relay R5, which thereupon breaks the holding circuit through the coil of relay R1, and at the same time maintains the circuit through the coil of valve HV1-A. When the control switch CS1 is released, relay R5 opens and interrupts the supply of current to the valve coil, thus stopping the ram.

(3) When the ram is moving under the control of the "automatic up" relay R3, the operation may be taken over by manual control switch CS1 through relay R7 without affecting the automatic cycle.

The claims contained in the present application all include a weighing scale. Claims to other subject matter disclosed will be presented in a divisional application.

What I claim is:

1. In a press for packing loose compressible material in containers, the combination with a container to be packed, and an upright, open ended charger located over said container, of a weighing scale platform on which said container and charger are normally supported, means for feeding material into the top of said charger, a power-operated, vertically moving ram disposed above said charger and constructed to enter the same to force the material therein into said container and compress the same, means controlled by said scale and responsive to the weight of material accumulated in said charger and container for initiating the downward movement of said ram, and automatic means for causing said ram to continue its downward movement to the end of its stroke, and thereafter to move upwardly again to its original position.

2. In a press for packing loose compressible material in containers, the combination with a container to be packed, and an upright, open ended charger located over said container, of a weighing scale platform on which said container and charger are normally supported, means for feeding material into the top of said charger, a power-operated, vertically moving ram disposed above said charger and constructed to enter the same to force the material therein into said container and compress the same, means controlled by said scale and responsive to the weight of material accumulated in said charger and container for initiating the downward movement of said ram, automatic means for causing said ram to continue its downward movement to the end of its stroke, and thereafter to move upwardly again to its original position, and manually controlled means for interrupting the operation of said automatic means and stopping the movement of said ram at any desired point.

3. In a press for packing loose compressible material in containers, the combination with a container to be packed, and an upright, open ended charger located over said container, of a weighing scale platform on which said container and charger are normally supported, means for feeding material into the top of said charger, a power-operated, vertically moving ram disposed above said charger and constructed to enter the same to force the material therein into said container and compress the same, means controlled by said scale and responsive to the weight of material accumulated in said charger and container for initiating the downward movement of said ram, and means for supporting said container and charger independently of said scale platform during said compressing operation, automatic means including a time relay for holding the material under pressure of said ram for a predetermined period of time while the container is held stationary, and means for automatically causing said ram to move upward to its starting position at the expiration of such period.

4. In a press for packing loose compressible material in containers, the combination with a container to be packed, and an upright, open ended charger located over said container, of a weighing scale platform on which said container and charger are normally supported, means for feeding material into the top of said charger, a power-operated, vertically moving ram disposed above said charger and constructed to enter the same to force the material therein into said container and compress the same, and means controlled by said scale and responsive to the weight of material accumulated in said charger and container for stopping the feeding of material into said charger and initiating the downward movement of said ram.

5. In a twin press for packing loose compressible material in containers, the combination with a pair of laterally spaced, vertically moving, power operated rams, of an upright, open-ended charger located beneath each ram, a container disposed beneath each charger, a weighing scale platform on which each container and associated charger is normally supported, a reversible packer conveyor extending between and above the upper ends of said chargers and serving to deliver material into one or the other of them dependent upon its direction of movement, a supply conveyor for feeding a stream of material onto said reversible conveyor at a point between said chargers, and means controlled by each weighing scale and responsive to the weight of material accumulated in the associated charger and container for initiating the downward movement of the corresponding ram, and at the same time reversing said packer conveyor.

6. In a twin press for packing loose compressible material in containers, the combination with a pair of laterally spaced, vertically moving, power operated rams, of an upright, open-ended charger located beneath each ram, a container disposed beneath each charger, a weighing scale platform on which each container and associated charger is normally supported, a reversible packer conveyor extending between and above the upper ends of said chargers and serving to deliver material into one or the other of them dependent upon its direction of movement, a supply conveyor for feeding a stream of material onto said reversible conveyor at a point between said chargers, means controlled by each weighing scale and responsive to the weight of material accumulated in the associated charger and container for initiating the downward movement of the corresponding ram, and normally at the same time reversing said packer conveyor, and means whereby the said weighing-scale-operated means, if the ram toward which the packer conveyor, when reversed, would deliver, is not all the way up, reverses the said supply conveyor instead.

7. A twin press according to claim 5, in which, while the packer conveyor is running in one direction and waiting to be reversed by the weighing scale, manual means are provided for reversing said conveyor at any desired time, without affecting the automatic cycle.

8. In a power-operated, electrically controlled press for packing loose compressible material, the combination with a charger and container, a vertically moving ram means for feeding a stream of material into said charger, a weighing scale platform on which said charger and container are supported, and means controlled by said weighing scale when the desired relatively small weight is reached for stopping the feeding of material into said charger and causing said ram to make a complete down stroke and return, and for again feeding material until a definite larger weight is reached, and then again stopping the feeding of material and initiating the downward stroke of said ram.

9. A press in accordance with claim 8 in which the means controlled by the weighing scale comprises a live contact and a pair of additional contacts, and means for connecting first one and then the other of said additional contacts with the live contact, as the weight on the scale increases.

10. A press in accordance with claim 8 in which the means controlled by the weighing scale comprises a live contact and a pair of additional contacts, means for connecting first one and then the other of said additional contacts with said live contact as the weight on the scale increases, and manual means for connecting said additional contacts together when desired.

11. In a press for packing loose, compressible material in containers, the combination with a vertically moving, power-operated electrically controlled ram, of an upright, open ended charger located beneath said ram, a container disposed beneath said charger, a weighing scale platform on which said container and charger is normally supported, means for delivering a stream of material into the top of said charger if said ram is at the upper limit of its stroke above said charger, means controlled by said weighing scale and responsive to the weight of material accumulated in said charger and container for initiating the downward movement of said ram after a predetermined amount of material has been delivered into the charger, and automatic means including a limit switch associated with said ram for preventing delivery of material into said charger if said ram is not all the way up.

12. In a twin press for packing loose compressible material in containers, the combination with a pair of laterally spaced, vertically moving, power operated rams, of an upright, open-ended charger located beneath each ram, a container disposed beneath each charger, a weighing scale platform on which each container and associated charger is normally supported, a reversible packer conveyor extending between and above the upper ends of said chargers and serving to deliver material into one or the other of them dependent upon its direction of movement, a supply conveyor for feeding a stream of material onto said reversible conveyor at a point between said chargers, means controlled by each weighing scale and responsive to the weight of material accumulated in the associated charger and container for initiating the downward movement of the corresponding ram, and normally at the same time reversing said packer conveyor, and means whereby the said weighing-scale-operated means, if the ram toward which the packer conveyor, when reversed, would deliver, is not all the way up, stops the feeding of material from said supply conveyor onto said reversible conveyor.

13. In a twin press for packing loose compressible material in containers, the combination with a pair of laterally spaced, vertically moving, power operated rams, of an upright, open-ended charger located beneath each ram, a container disposed beneath each charger, a weighing scale platform on which each container and associated charger is normally supported, a reversible packer conveyor extending between and above the upper ends of said chargers and serving to deliver material into one or the other of them dependent upon its direction of movement, a supply conveyor for feeding a stream of material onto said reversible conveyor at a point between said chargers, and means controlled by each weighing scale and responsive to the weight of material accumulated in the associated charger and container for causing the said rams to operate alternately and for periodically reversing said packer conveyor in proper timed relation with the movement of said rams.

14. In a press for packing loose compressible material in containers, the combination with a container to be packed, and an upright, open ended charger located over said container, of a weighing scale platform on which said container and charger are normally supported, means for feeding material into the top of said charger, a power-operated, vertically moving ram disposed above said charger and constructed to enter the same to force the material therein into said container and compress the same, means controlled by said scale and responsive to the weight of material accumulated in said charger and container for initiating the downward movement of said ram, automatic means for causing said ram to continue the downward movement, thus initiated, and manually actuated means whereby the operation of said automatic means may be interrupted at any desired point and the ram further operated under manual control, and whereby the control may be returned, whenever desired, to said automatic means.

References Cited in the file of this patent

UNITED STATES PATENTS

| | | |
|---|---|---|
| 2,373,838 | Lindholm | Apr. 17, 1945 |
| 2,497,015 | Richardson | Feb. 7, 1950 |
| 2,518,223 | Christiansen | Aug. 8, 1950 |
| 2,584,338 | Ferguson | Feb. 5, 1952 |
| 2,619,272 | Boehling | Nov. 25, 1952 |
| 2,732,113 | Rice | Jan. 24, 1956 |
| 2,834,383 | Williams | May 13, 1958 |
| 2,901,007 | Hubbell | Aug. 25, 1959 |